United States Patent
Connolly et al.

(10) Patent No.: US 9,946,606 B1
(45) Date of Patent: Apr. 17, 2018

(54) STREAM ARCHITECTURE FOR DATA REPRESENTATION

(75) Inventors: Nicholas C. Connolly, Purley (GB); Robert Bassett, Pensacola, FL (US); Ziya Aral, Pompano Beach, FL (US); Roni J. Putra, Pompano Beach, FL (US)

(73) Assignee: DataCore Software Corporation, Fort Lauderdale, FL (US)

( * ) Notice: Subject to any disclaimer, the term of this patent is extended or adjusted under 35 U.S.C. 154(b) by 17 days.

(21) Appl. No.: 12/926,438

(22) Filed: Nov. 18, 2010

(51) Int. Cl.
*G06F 12/00* (2006.01)
*G06F 11/14* (2006.01)

(52) U.S. Cl.
CPC .................. *G06F 11/1456* (2013.01)

(58) Field of Classification Search
CPC .................................................. G06F 11/1456
USPC ......................................................... 711/162
See application file for complete search history.

(56) References Cited

U.S. PATENT DOCUMENTS

| | | | |
|---|---|---|---|
| 6,530,043 B1 * | 3/2003 | Beardsley et al. | 714/52 |
| 6,732,125 B1 * | 5/2004 | Autrey et al. | 707/640 |
| 7,565,498 B1 | 7/2009 | Baird et al. | |
| 2007/0100917 A1 * | 5/2007 | Amano | G06F 11/1435 |
| 2007/0168403 A1 * | 7/2007 | Meiri et al. | 707/204 |
| 2007/0214334 A1 | 9/2007 | Maruyama et al. | |
| 2008/0243946 A1 | 10/2008 | Deguchi et al. | |
| 2009/0013012 A1 | 1/2009 | Ichikawa et al. | |
| 2010/0077173 A1 | 3/2010 | Rao et al. | |
| 2014/0074969 A1 | 3/2014 | Kadayam et al. | |
| 2014/0351545 A1 | 11/2014 | Nakajima | |

OTHER PUBLICATIONS

U.S. Office Action dated Mar. 21, 2016 for commonly assigned U.S. Appl. No. 14/212,165, filed Mar. 14, 2014.
U.S. Office Action dated Nov. 9, 2016 for commonly assigned U.S. Appl. No. 14/212,165, filed Mar. 14, 2014.
U.S. Office Action dated Jun. 16, 2017 for commonly assigned U.S. Appl. No. 14/212,165, filed Mar. 14, 2014.

* cited by examiner

*Primary Examiner* — Larry T Mackall
(74) *Attorney, Agent, or Firm* — Michael Best & Friedrich LLP

(57) ABSTRACT

A stream architecture for data representation is disclosed. A stream is retained with respect to write transactions to a given volume. The stream includes the write transactions and provides a sequence of the write transactions according to the order in which the write transactions were received for the given volume. By way of example, a stream image can be associated to the stream. The stream image provides a representation of the data in the given volume for a point in time by referencing a non-contiguous subset of the sequence of write transactions in the stream.

17 Claims, 20 Drawing Sheets

| TYPE_WRITE |
|---|
| Block Offset in Volume |
| Length of Write in Blocks |
| Block offset of data in Data Store |

| TYPE_ZERO |
|---|
| Block Offset in Volume |
| Length of Write in Blocks |
|  |

| TYPE_TIME |
|---|
| Timestamp |
|  |
|  |

STREAM ARCHITECTURE FOR DATA REPRESENTATION

BACKGROUND OF THE INVENTION

1. Field of the Invention

The present invention relates generally to data representation and more particularly to a stream architecture for data representation.

2. Description of the Related Art

Conventional storage systems have implemented log files. These have typically been at the file system level. For example, a log-structured file system may append writes to a log. The log may be the only data structure on the disk, and is designed to increase write bandwidth. Logs are also typically designed to preserve only the "now" version of the file system. They are not typically configured to preserve historical data in a fashion that could support arbitrary point-in-time selection.

Some systems may implement log-structured file systems that are configured to perform very fast snaps, or may be configured to implement a block device, a virtual SCSI disk array. Regardless, conventional log files and corresponding systems typically either only preserve the "now", so the log is just for write performance, or at most a preserved "now" and selected snapshots, and nothing in between.

What is needed is a data representation architecture that preserves a history of changes and includes support for arbitrary, after the fact point-in-time selection, as well as other data representations that are not found in or supported by existing logging techniques.

SUMMARY OF THE INVENTION

A stream architecture for data representation. A stream is retained with respect to write transactions to a given volume. The stream includes the write transactions and provides a sequence of the write transactions according to the order in which the write transactions were received for the given volume. By way of example, a stream image can be associated to the stream. The stream image provides a representation of the data in the given volume for a point in time by referencing a non-contiguous subset of the sequence of write transactions in the stream.

The present invention can be embodied in and in connection with various forms, including but not limited to business processes, computer implemented methods, computer program products, computer systems and networks, user interfaces, and application programming interfaces.

BRIEF DESCRIPTION OF THE DRAWINGS

These and other more detailed and specific features of the present invention are more fully disclosed in the following specification, reference being had to the accompanying drawings, in which:

FIGS. 14A-C are block diagrams illustrating example of a stream overhead data.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

At least one embodiment of the present invention implements what is referred to as a stream architecture for data representation. The architecture supports layering and is suitable for composition in various ways. That is, the architecture is organized around building blocks that may be combined in many different ways, to solve different storage challenges.

Following is an introduction to some terminology used in this description. Some terminology is capitalized throughout the description. This is done for ease of reading, rather than an attempt to define or limit the used terminology.

A data store (or "store") refers to a pool of storage. This can, for example, be a disk, a RAID LUN, an aggregation of disks or LUNs, etc. This is where the various data described herein may be stored in a persistent manner.

A stream is a readable and extendible history of all of the writes. A stream may begin at a time "t" and end at another later time. A stream may be referred to as "active" or "open" when it can still be written to.

An image is a representation of data in a volume that is made by reference to the stream. An image can be thought of as a "view" or an "index" into a stream, to facilitate certain types of accesses. The image may be generated by referencing overhead data within the stream. The image may be stored for future use, or may be generated on demand, by referral to the stream including the overhead data therein.

There are different kinds of images: a full image [written FullImage(t)], a sparse image [written SparseImage(t1,t2)], and a Meta image [written MetaImage(t1,t2)]. An image may be thought of as a time-based representation of a volume in the stream.

A volume is the unit of presentation to client devices. Client devices see and interact with volumes as their storage resources. Consistent with the stream architecture, volumes may be composed of streams, images, and/or other volumes. Volumes are a container by which new storage devices may be built from compositions of images, streams, and other volumes.

The Behavior of the Architecture

Figure 1:
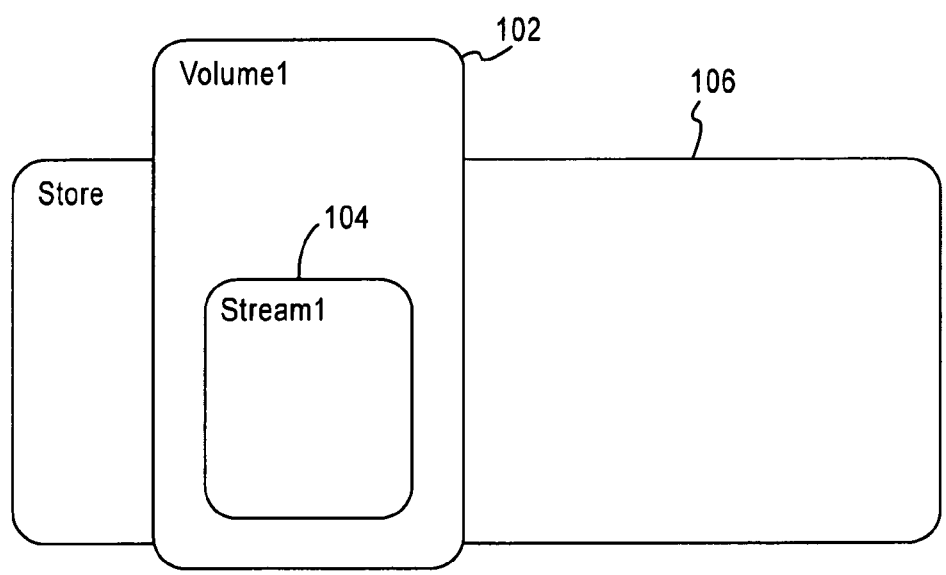
FIG. 1 is a block diagram illustrating an aspect of the stream architecture, particularly the relationship of a volume and corresponding stream and data store.

FIG. 1 is a block diagram illustrating an aspect of the stream architecture, particularly the relationship of a volume 102 and an associated stream 104 and data store 106. The volume 102, implemented by the stream 104, appears like a normal disk device to a client device.

A data store 106 may be thought of as the substrate of data storage where objects implemented in the architecture reside and persist. The data store 106 may be constituted of physical media or may also be a virtual disk (which, in turn, may have corresponding underlying physical storage, provided otherwise). The data store 106 is intended to conceptually illustrate such a substrate, but it should be understood that it is not necessarily a single monolithic storage entity. Rather, the underling data store 106 may comprise an underlying hierarchical organization of storage, physical and/or virtual.

It is also noted that where physical storage resources are implemented, they may be variously embodied, including but not limited to hard disks, optical discs, tape, solid state memory, etc.

The stream 104 may implement any form of simple or complex data structure, including but not limited to tree structures, queue and stack structures, maps, etc.

The stream 104 is created from the underlying data store 106. A client device sees the volume 102 as a disk for the purposes of storage transactions, and interfaces with the volume 102 with respect to IO transactions without requiring the client device to have information regarding the stream 104.

A volume 102 has the characteristics of a "normal" block device. It behaves like a disk in that it is block level oriented and is readable and writable. That is, when a client device writes "a" to block 0 and later reads block 0, the client device receives "a". When a client later writes "f" to block 0 and then reads block 0, the client receives "f" in response to the read, not the previously stored "a". However, the stream 104 includes additional functionality and characteristics beyond those of a normal block device such as a disk.

It is further noted that in FIG. 1, as in other figures of the same type in this description, the stream 104 is not encapsulated within the volume 102. The intent is to illustrate that the volume 102, which is accessible as a normal volume 102 by a client device, has an associated stream 104, with the stream 104 having the underlying data store 106 as a storage resource foundation.

Figure 2:
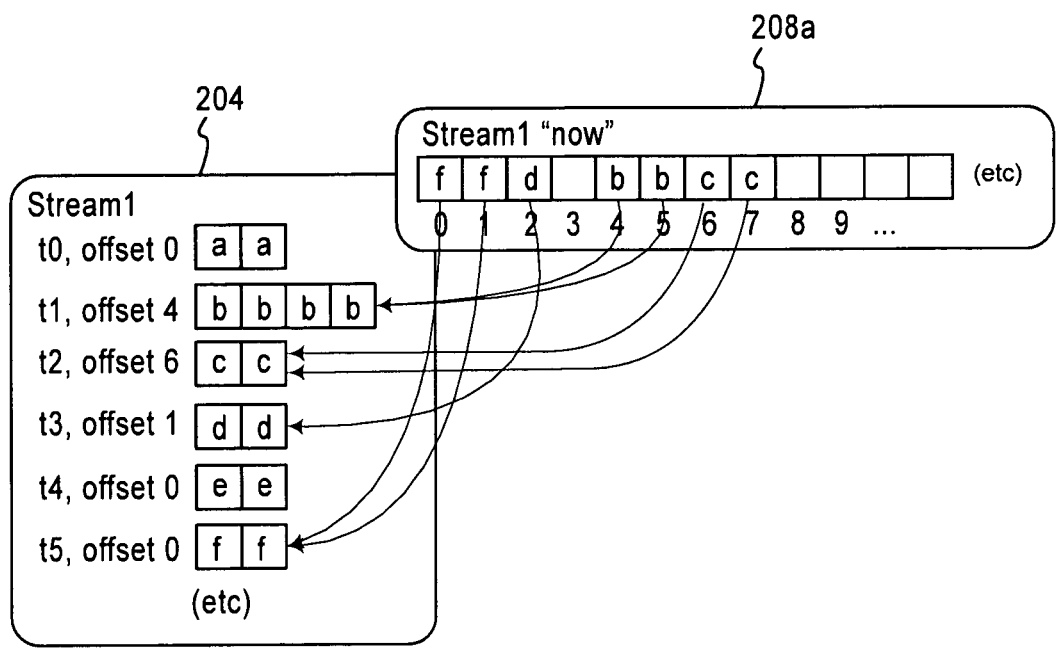
FIG. 2 is a block diagram illustrating a stream and associated stream image.

FIG. 2 is a block diagram illustrating a stream 204 and associated stream image 208a, corresponding to a volume such as the volume 102 depicted in FIG. 1. This example illustrates how the stream 204 records changes and implements random read access for the "now" version of the volume accessible by a client.

The stream 204 preferably maintains a recording of all changes to the volume. Additionally, if a block has never been written, then it defaults to all 0's (empty blocks in the stream 204 as shown). It should be understood that other default statuses, including but not limited to all 1's may be provided for blocks that have not been written.

For example, as indicated in FIG. 2, at t0 two blocks "a" are written to the volume and thus are also written to the stream 204 starting at offset 0. At this time t0, the image 208a is updated to reference the fact that the two blocks "a" are written to the stream 204. In this fashion, the offset 0 block and offset 1 block of the image 208a would indicate "a" and "a" at time t0. However, this is not depicted in the "now" version of the image 208a because there were overwrites to blocks 0 and 1 subsequent to time t0.

The recording of writes in the stream 204 and corresponding referencing by the image 204 continue to be updated as writes occur. For example, at time t1 the stream 204 records four blocks depicted as "b" starting at offset 4; at time t2 the stream 204 records two blocks depicted as "c" starting at offset 6, and so on as depicted in FIG. 2.

Each time the stream 204 records a write to the volume, the image 208a is updated so that it references the stream 204 accordingly. In this fashion, the stream 204 maintains a recording of changes to the volume, including data that is ultimately overwritten, but the image 208a contains references that collectively represent the entire state of the volume at time t. In particular, the depicted "now" version of the image 208a represents the volume as of the last write (here, t5).

Thus, the image 208a and the corresponding stream 204 can be used to recover, replicate or provide any variety of storage management functions for the corresponding volume at any given time t up through the time "now". It should be noted the stream image 208a may be "saved" at any time where such is desired, or may also be generated by accessing the stream 204 after the fact (e.g., at time t5, without having retained the image for past time t3, one can retroactively generate an image for time t3).

Each change in the stream may have associated overhead data, which may also be referred to as metadata. Typically, each write transaction will have a piece of overhead data that is provided in the stream. Such a write transaction may of course include numerous Blocks, meaning that a separate piece of overhead data does not need to be maintained for every single Block. This reduces overall overhead.

As such, the architecture provides for a retainable representation of the full version of the volume at any given time, even after the fact. The stream 204 allows recovery of the volume at any given time, and the image 208a compliments the stream 204 by providing a full representation of the volume at any time "t".

The stream and image scheme itself offers space reduction in that numerous instances of the image may be retained without requiring numerous instances of all the data on the volume to be replicated for each image.

Figure 3:
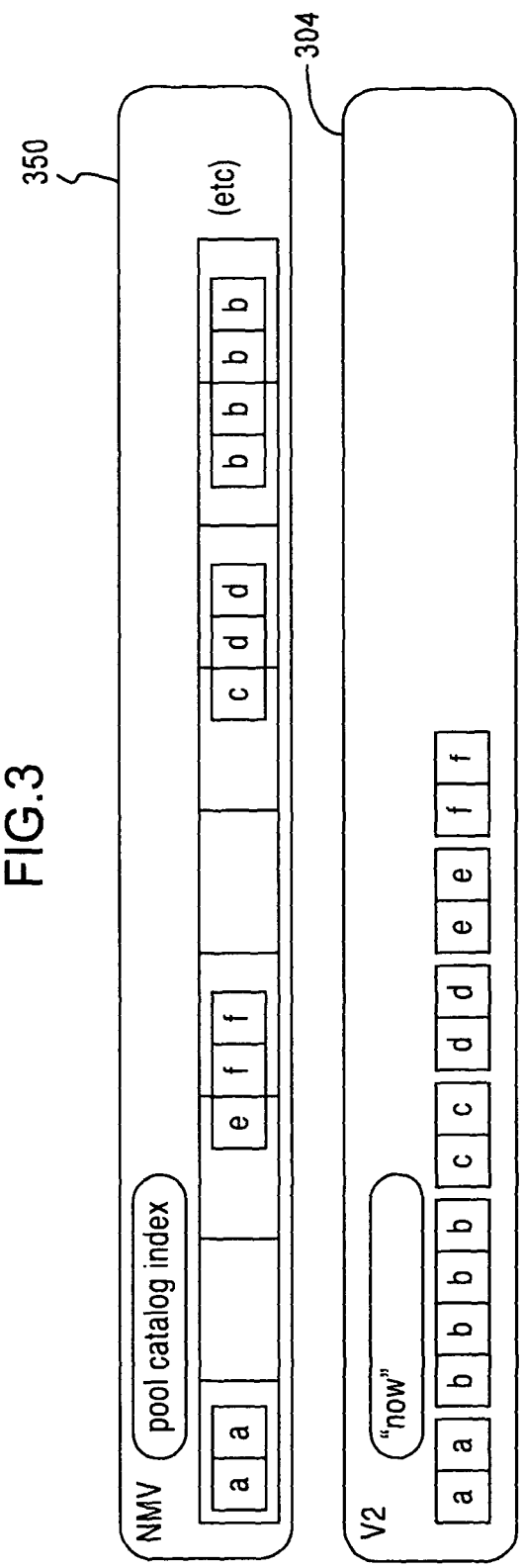
FIG. 3 is a block diagram illustrating a comparison of how a thinly provisioned virtual volume may organize writes as compared to the stream architecture.

Additionally, the stream itself provides space reduction. FIG. 3 is a block diagram illustrating a comparison of how a thinly provisioned virtual volume, which may be referred to as a "Network Managed volume" (NMV) 350 may organize writes as compared to the stream 304 architecture. The stream 304 architecture stores only what is written, and some overhead data, and in most circumstances uses less disk space than an NMV since the writes can be packed sequentially. In FIG. 3, the same series of writes is illustrated as scattered on an NMV volume 350, and packed sequentially on the stream 304. Writes are often scattered, and in thin provisioning schemes this prompts numerous allocations of storage allocation units (SAUs) "underneath" the block locations of the writes. This potentially can waste space. However, the stream architecture writes may be appended to the history in the stream 304, allowing more efficient space utilization.

The overhead data takes up some space, but it is a small fraction of the data payload.

Additionally, a stream stores information for writes to blocks that are subsequently overwritten (e.g., as in FIG. 2, and as in FIG. 3 wherein part of the "e" write was overwritten by the "f" write). This uses additional storage space; however, this additional storage is not "wasted" space. It has value, including provision for after the fact recovery as well as other features described further below.

When the stream architecture uses an appended storage operation, this can have performance implications, since appending writes to the stream create a sequential write pattern in the backend store, regardless if the client write pattern is random or sequential. This allows the opportunity to take full advantage of the data store bandwidth (RAID "full stripe writes", large transfer sizes, aligned to storage media, etc). However, there may be a tradeoff as the overhead data should be maintained to quickly locate a requested block, and individual Read operations may become slower.

Additionally, caching can be used to amortize any cost imposed by the allocation scheme used by or in the stream.

The stream architecture may optionally implement an append scheme wherein when a space is overwritten on a stream architecture volume, there is no overwrite in the associated stream. Instead, there is an append to the stream. This means that the stream may be embodied as a data structure, which can exist on Write-once media. This also means that the stream itself can be a type of Write-once media. That is, in some embodiments the stream architecture can be used to implement WORM devices.

It is noted that appending each write transaction to a single store is certainly not the only mechanism for maintaining the stream. The writes can be stored wherever is convenient, may be placed in arbitrary locations, and may implement a plurality of virtual or physical stores. However, whether in a linear append mode or an arbitrary allocation mode, the sequence of write transactions according to the order in which the write transactions are received for a given volume is retained. This maintenance of the sequence of write transactions may be performed within the stream itself, via the overhead data. Additionally it is noted that the overhead data may be separately stored.

Figure 4:
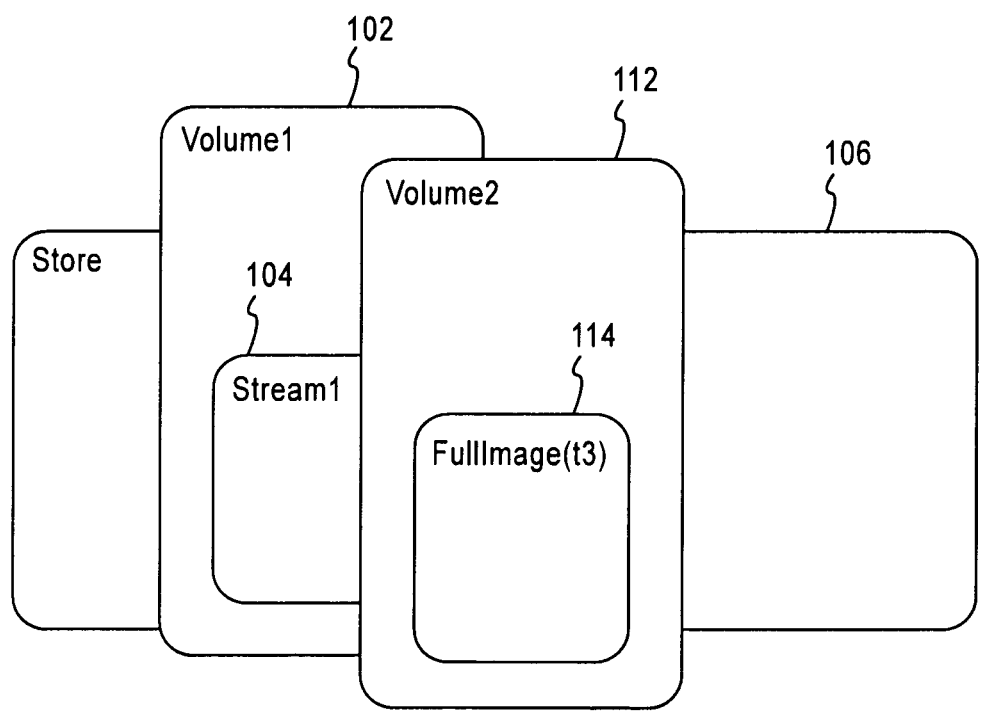
FIG. 4 is a block diagram illustrating another aspect of the stream architecture, particularly the relationship of multiple volumes and different forms of representation of the volumes.

FIG. 4 is a block diagram illustrating another aspect of the stream architecture, particularly the different forms of representation for multiple volumes. Consistent with FIG. 1, the relationship of a volume 102 and associated stream 104 and data store 106 are illustrated. Additionally, another volume 112 presents a full image at time t3, denoted FullImage(t3) 114.

This new volume 112 presents the image of time t [written FullImage(t)]. This image "points" into a part of the stream that contains the history of writes on the original volume up to time t. That is, it represents the volume as it was at time t, even if the volume has experienced additional writes since that time. The image is a read-only representation of the volume that may be retained for future access.

Figure 5:
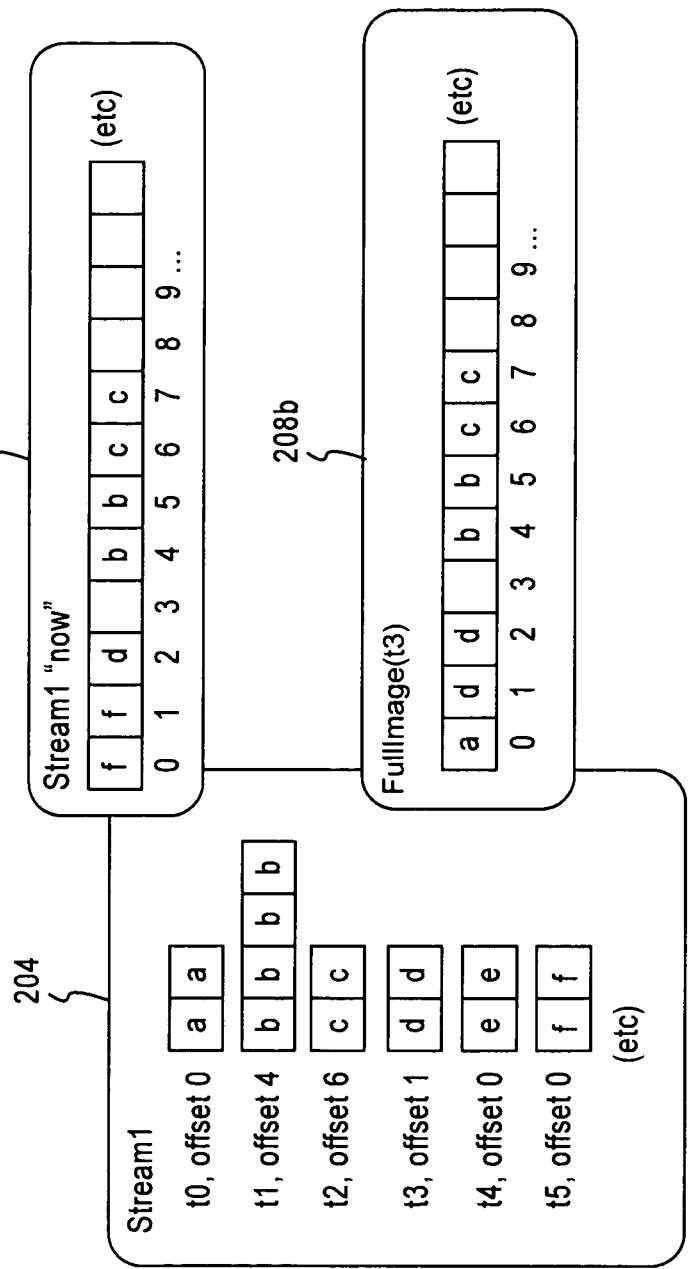
FIG. 5 is a block diagram illustrating a stream and stream indices associated to an original volume and an additional volume.

FIG. 5 is a block diagram illustrating a stream 204 and associated stream Indices 208a-b, corresponding to the original volume 102 and another volume 112 depicted in FIG. 4.

Image(t3) 208b is a type of stream image that shows what the volume looked like at time t3, even while the original stream 204 still continues to represent "now", the current version of the original volume 102. Both stream Indices 208a-b point back into the original stream for the data. They preferably do not contain copies of the data itself.

The stream Architecture does not require preservation of an image for any time t in order to acquire a full representation of a volume at that time. This is in contrast to a disk "snapshot" which is snapped at a given point in time and is then preserved. Instead, the full image may be created at some time later than t. Additionally, this new volume 112 can be presented and accessed even while the originating stream is still "active" (still being written to by a client).

FIG. 5 also illustrates that the stream Architecture can provide both CDP and snapshot capabilities. The stream 204 records activity to the volume. Additionally, as noted above, at any time t recorded in the stream 204 one can access a full image of the volume as it existed at that time t. Additionally, if a FullImage(t) at time t is created, it is then a snapshot of the volume at time t. While this is occurring, the stream 204 remains available for continued writes to the original volume 102 and continues to append writes for that volume 102.

The stream Architecture also avoids copy-on-write migration penalties that may be present in traditional snapshot techniques. That is, for a snapshot, when a client writes to a block, the snapshot system may need to migrate the "chunk" containing that block somewhere else first, in order to preserve the point-in-time contents of the block. By contrast, the copy of the data that is used to represent the point-in-time volume remains untouched in an earlier part of the stream 204 and does not require subsequent housekeeping.

Figure 6:
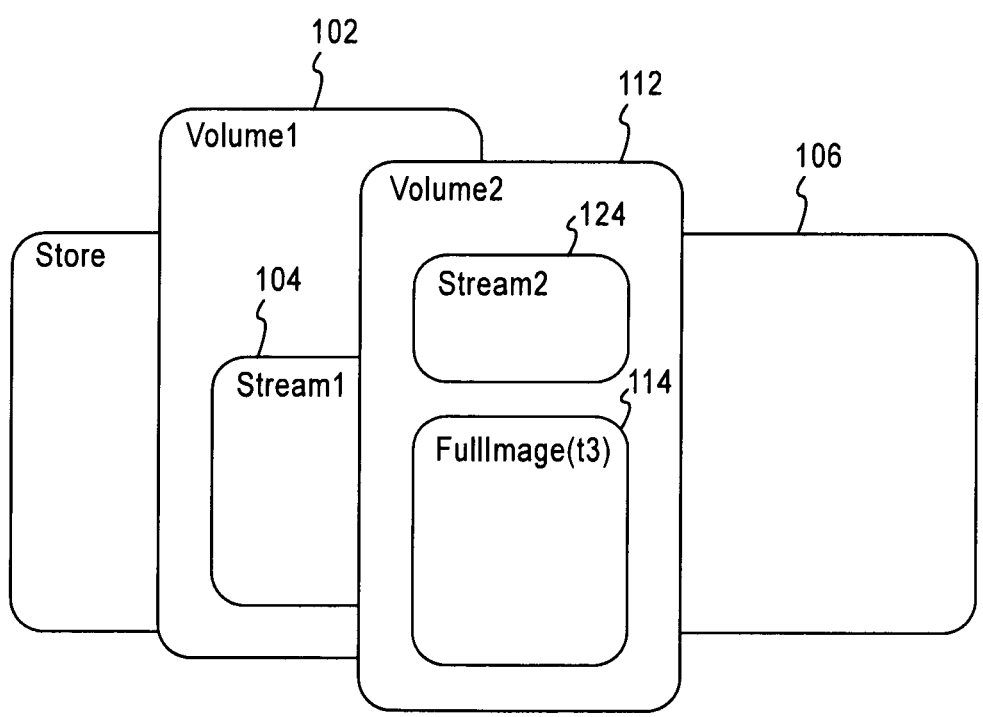
FIG. 6 is a block diagram illustrating that a point-in-time snapshot volume can also be a read/write volume.

FIG. 6 is a block diagram illustrating another aspect of the stream architecture, particularly how a volume can be treated as both a read/write volume and a point-in-time snapshot. The relationship of a volume 102 and corresponding stream 104 and data store 106 are again illustrated, as is the volume 112 that presents a full image at time t3, denoted FullImage(t3) 114, as well as a corresponding additional stream 124.

In FIG. 4, the volume 112 with the FullImage(t3) 114 was considered a read only volume. Here, however, the inclusion of additional stream 124 renders volume 112 a read/write volume. This can be referred to as layering a stream 124 "on top of" the FullImage(t3) 114. This new stream 124 records changes that are made to the FullImage(t3) 114 volume. In other words, the stream 124 records all of the changes that occur to the original volume using the representation of FullImage(t3) as a baseline. This provides a writable point in time volume, or a R/W Snapshot at time t3, in that the FullImage(t3) represents the point in time volume at time t3, and the overlaid stream 124 offers various additional representations including representations entailing the writes following the point in time.

Figure 7:
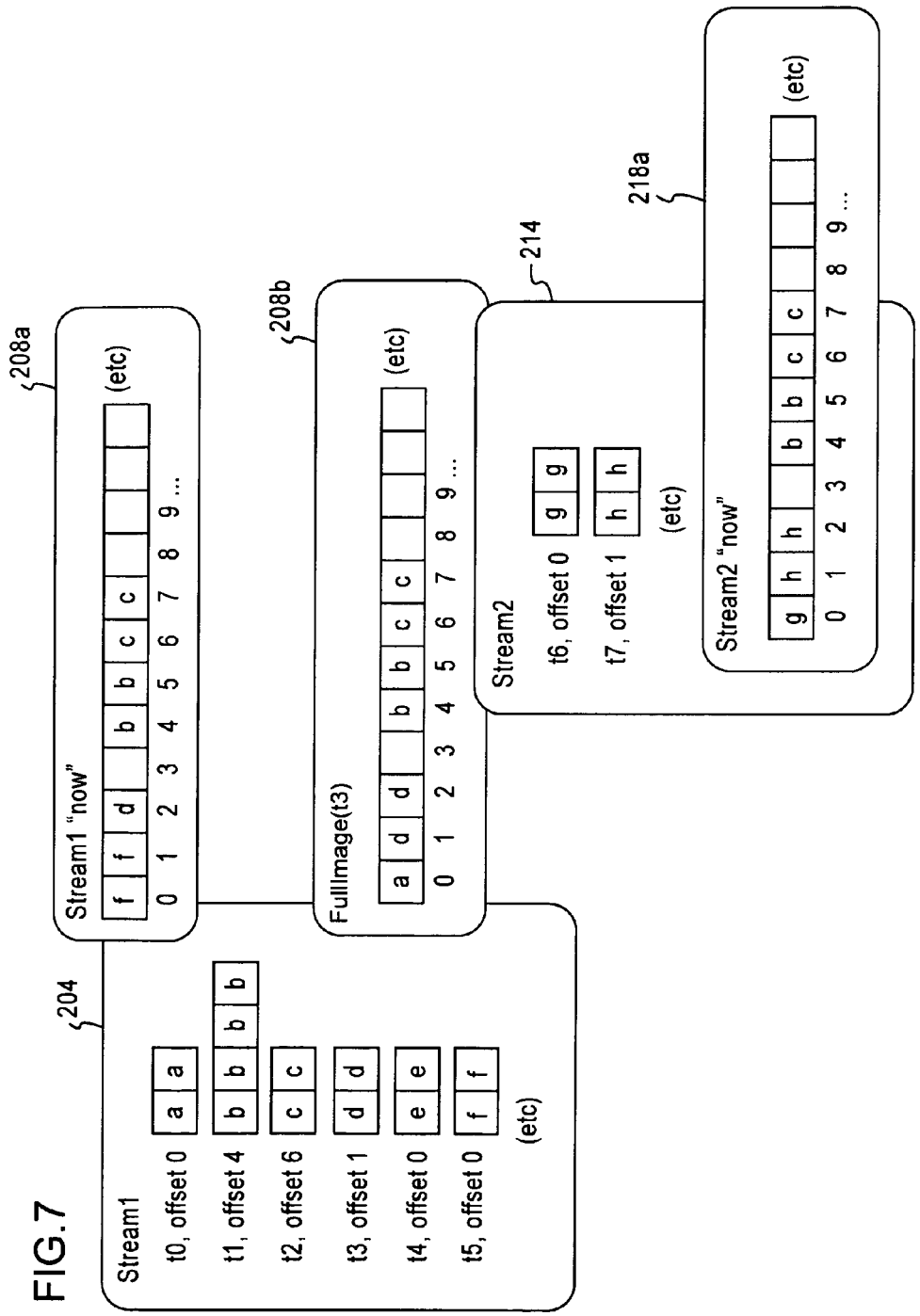
FIG. 7 is a block diagram illustrating a stream and associated stream indices, as well as another stream having an associated stream image.

FIG. 7 is a block diagram illustrating a stream 204 and associated stream Indices 208a-b. It also further illustrates layering of another stream 214 having an associated stream image 218a onto a previous representation.

As has been explained, a client device writes to the original volume from time t0 to time t5, and then the stream Architecture is invoked to create a FullImage(t3) 208b. This provides an image of the original volume as it existed at time t3.

Another stream 214 is then created on top of, or layered upon, the FullImage(t3) 208b. This stream 214 has an associated "now" image 218a just as the first stream 204 does.

Reads from the new volume use an image 218a that may reference both the original stream 204 and the new stream 214. Writes to the new volume are simply appended to the new volume's stream 214. Writes to the original volume are simply appended to the original volume's stream 204, which does not affect the new stream 214.

As can be seen in FIG. 7, the stream architecture and its supported layering allow the blocks in offsets 4-7 ("b", "b", "c", "c") to appear in the "now" image 218a even though stream 214 records only changes to offsets 1-2. FIG. 7 also further illustrates how layering supports provision of a R/W snapshot as explained for FIG. 6. Specifically, the FullImage (t3) 208b is retained (or generated after the fact) as an archived image from the first stream 204, and the second stream 214 records changes thereafter. It should be understood that the layering may continue. For example, a full image of the second stream 218a may be taken at time t7, and then a new third stream may be layered on top.

Figure 8:
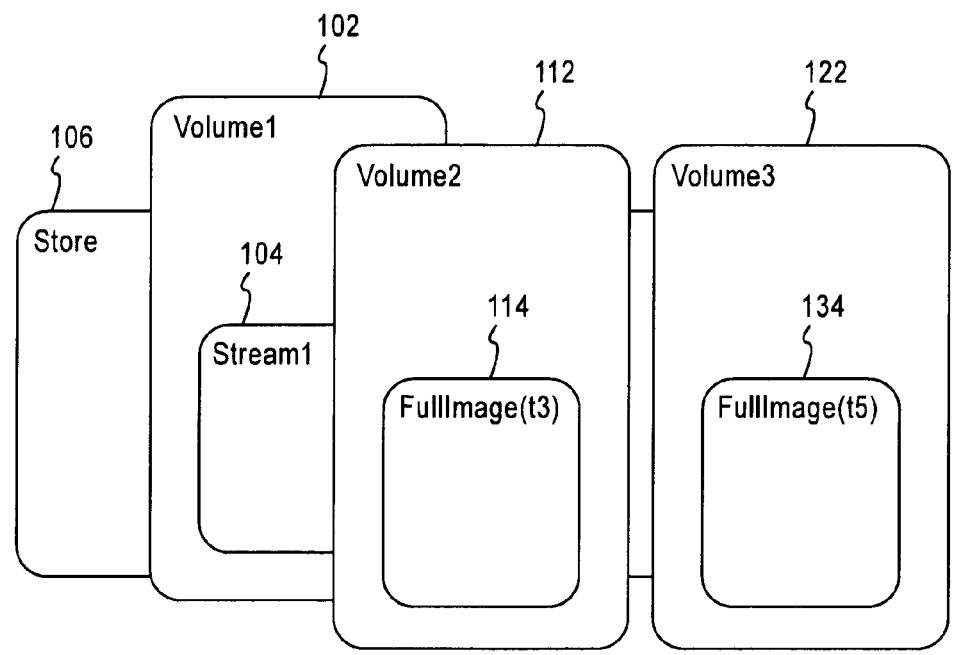
FIG. 8 is a block diagram illustrating that multiple images may presented from a stream.

FIG. 8 is a block diagram illustrating another aspect of the stream architecture, particularly that multiple images may be presented from a stream. The relationship of a volume 102 and corresponding stream 104 and data store 106 are illustrated. Additional volume 112 presents a full image at time t3, denoted FullImage(t3) 114, and additional volume 122 presents a full image at time t5, denoted FullImage(t5) 134.

FIG. 8 illustrates a variation on FIG. 4, which indicates presentation of a single FullImage(t) from a stream. Here, multiple Images, namely FullImage(t3) 114 and FullImage(t5) 134 are presented from a stream. This is notable in that it does not require additional data space. Since the originating stream contains the data, the Images are small "indexes" of the original stream. The Images may use space for overhead data, but again this is a small fraction of the space required in the original stream.

Figure 9:
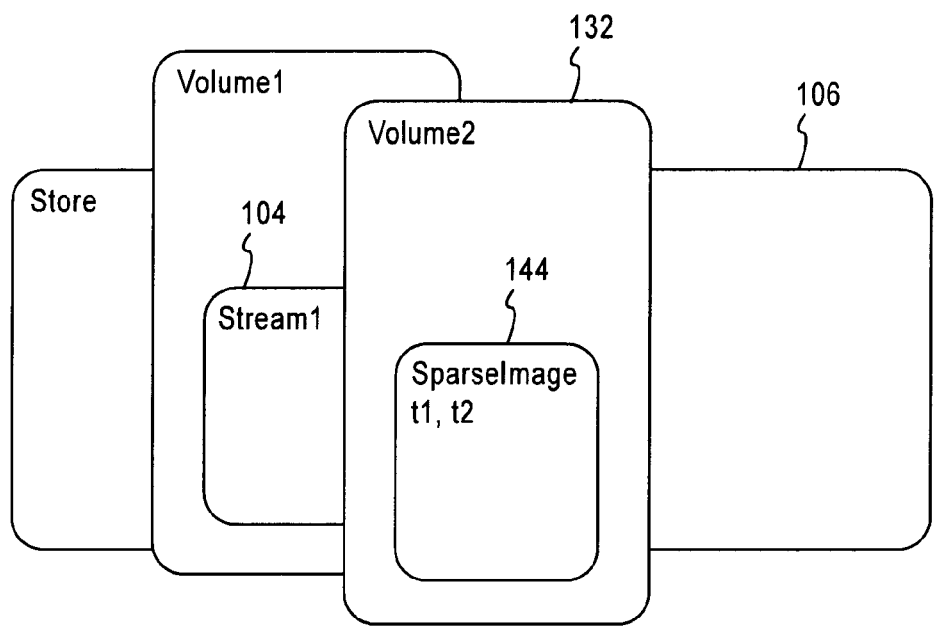
FIGS. 9-11 are block diagrams illustrating sparse image volumes and indices implemented by the stream architecture.

FIG. 9 is a block diagram illustrating a sparse image (144) implemented by the stream Architecture, and another example of an additional volume 132. A sparse image is another example of a stream Image, but represents the "end result" of changes recorded in a stream between a first and second time recorded in the stream. An example, between time t1 and time t2, is denoted as SparseImage(t1,t2) 144. This SparseImage(t1,t2) 144 does not describe the history of changes between t1 and t2 (it eliminates overwrites, for example), and does not describe any history before t1 or after t2.

Figure 10:
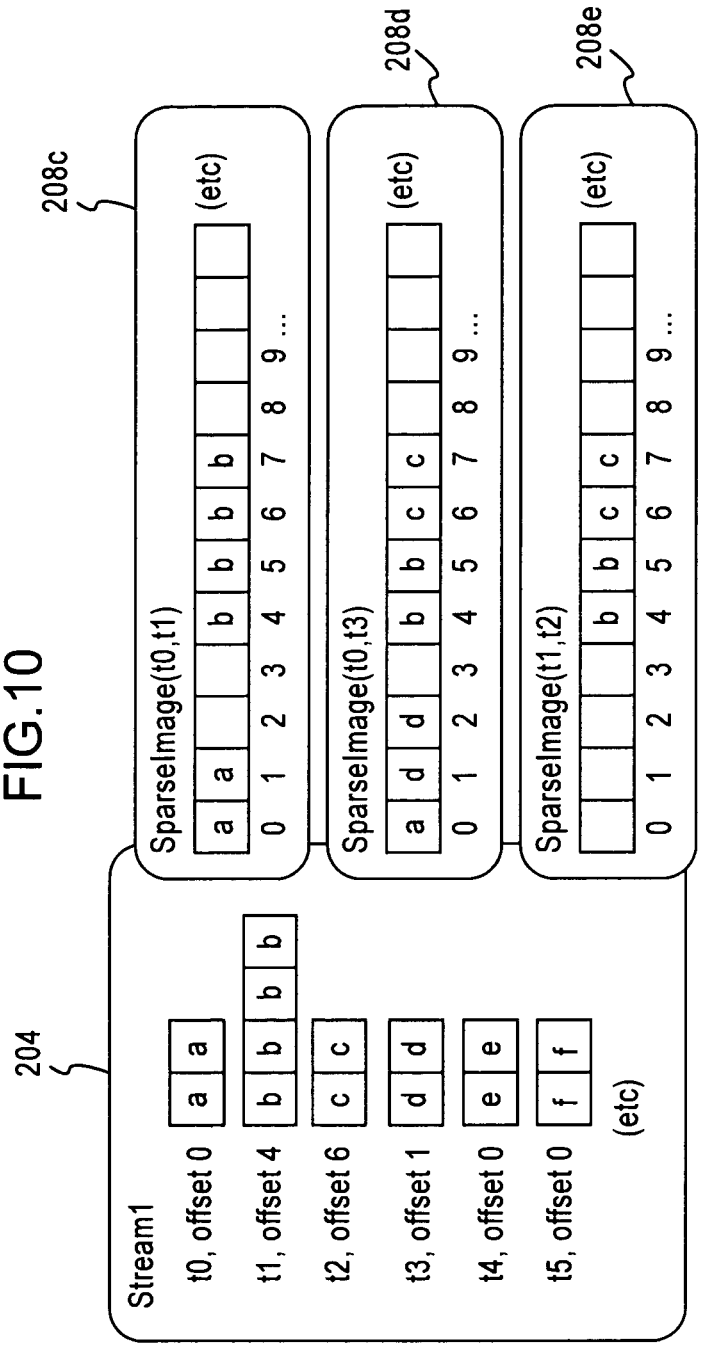

FIG. 10 is a block diagram illustrating a stream 204 and associated stream Indices 208c-e, which in this example are SparseImage(t0,t1) 208c, SparseImage(t0,t3) 208d and SparseImage(t1,t2) 208e.

The stream 204 has recorded t0, t1 . . . t5, and contains overwrites. For example, the write at t2 overwrites changes made by the write at t1, and the write at t3 overwrites the changes made by the write at t0. With the sparse image, the "end result" is only retained, and portions of the stream "outside" the times of the sparse image are not described (empty). For example, the SparseImage(t0,t3) 208d reflects the overwrites through time t3 (e.g., the "d" in block 1 has overwritten the "a" in block 1 from time t0. Additionally, the SparseImage(t1,t2) 208c illustrates how the writes of times t0 and t3-5 are not represented, and how only the end result of the overwrite at time t2 is represented in the Image.

Figure 11:
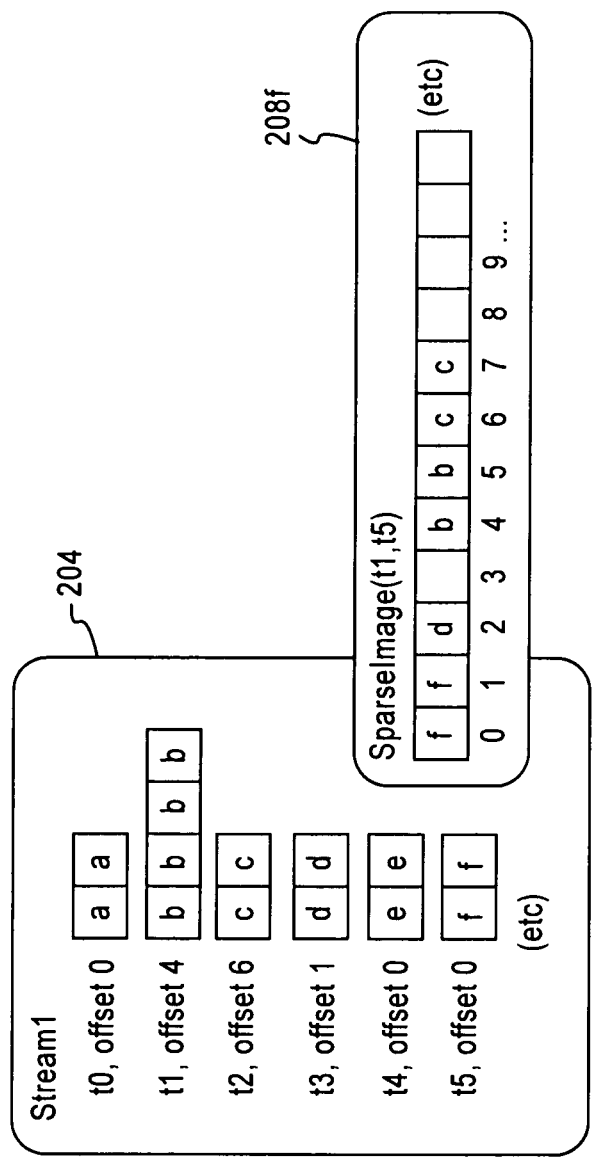

A sparse image is a form of image with additional usefulness beyond the "now" image and Full Image. FIG. 11 illustrates another example of a SparseImage(t1,t5) 208f.

Consider a sparse image as it relates to mirroring, with a volume being mirrored from local to a remote. Assume that the link goes down at t1 and the local site keeps receiving changes (recorded in a stream), with the remote site stranded at t1. If the link comes back up at t5, the mirroring needs to appraise the remote site as to the missing information from t1 to t5.

In this situation, the stream could be "replayed" to send over all of the changes "verbatim", but this would replay overwrites. Instead, a SparseImage(t1,t5) 208f is determined and then is "walked" in block order. Block 0 is 'f', block 1 is 'f', block 2 is 'd' . . . . The sparse image allows a corresponding update on the remote to skip the "holes" (the empty boxes), as well as the overwrites, moving only the "end result" over to the remote site. The sparse image may be used for both synchronous and asynchronous mirrors.

Additionally, the SparseImage(t1,t5) 208f can be used to undo from t5 to t1. Here, an original or "first" volume1 may have been updated from t0 through t5, and another "second" volume2 may merely include updates through t0. Assuming that one wants to "undo" the changes on the original volume, making it identical with the second volume, the SparseImage(t1,t5) 208f may be used for instruction as to which data should be fetched from the volume.

For example the sequence may be as follows: (1) Block 0, read block 0 of volume2 and write to block 0 on volume1. Now volume1 block 0 is t1; (2) Block 1, read block 1 of volume2 and write to block 1 on volume1. Now volume1 block 1 is t1; (3) Block 2, read block 2 of volume2 and write to block 2 on volume1; (4) Skip Block 3; (5) Block 4, read block 4 of volume 2; etc.

Figure 12:
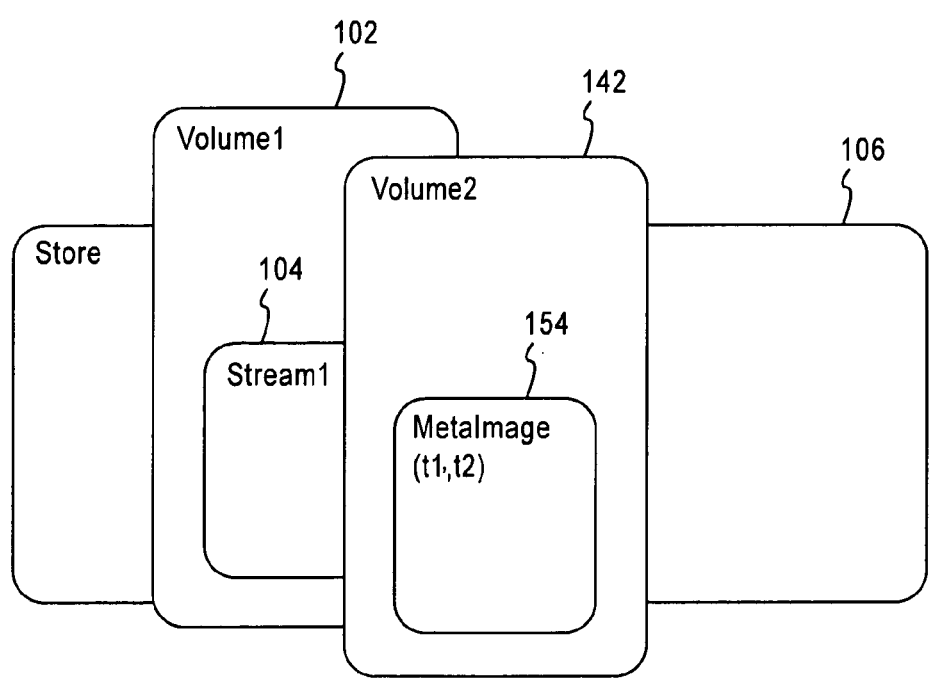
FIGS. 12-13 are block diagrams illustrating meta image volumes and indices implemented by the stream architecture.

FIG. 12 is a block diagram illustrating a "MetaImage" 154 and an associated volume 142 implemented by the stream architecture. A meta image 154 gives a more or less direct "view" into a stream. Unlike the sparse image, the history is preserved in the meta image 154 representation. Through the meta image, the stream architecture provides the list of changes recorded in a stream between two points in time. Overwrites and timestamps are included.

The previous examples of data representations provide, for example, full or sparse representations of data in a volume. The meta image 154 differs in that it represents historical information concerning changes to the volume, rather than the data itself.

Figure 13:
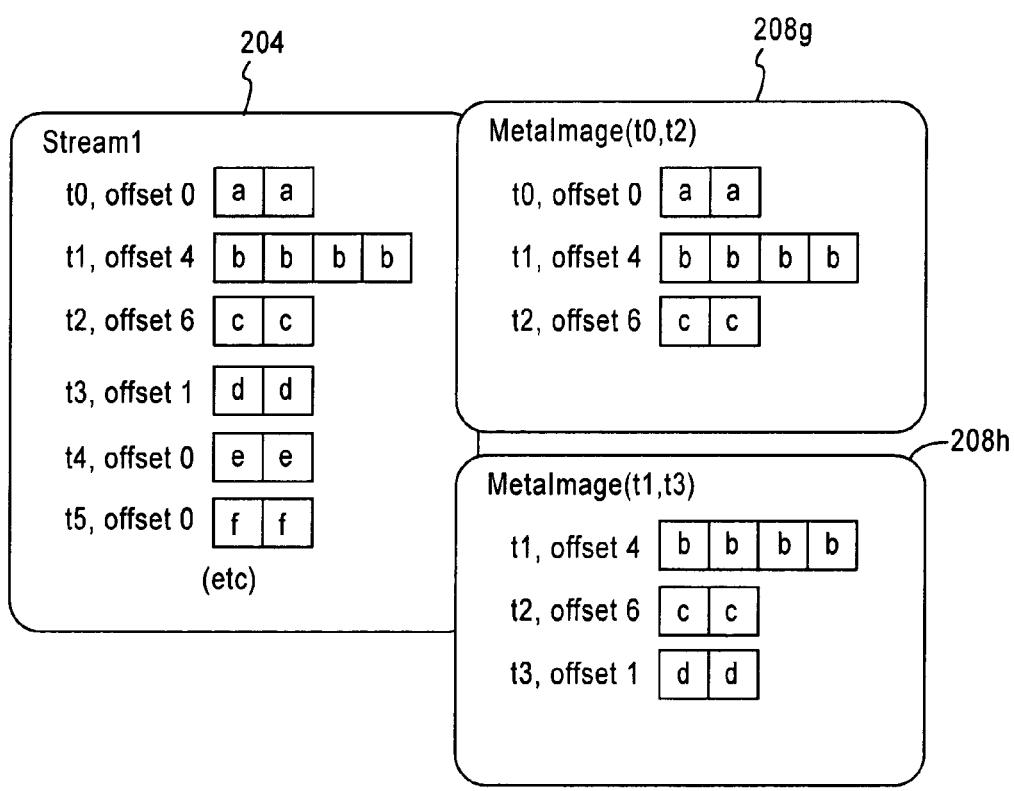

FIG. 13 is a block diagram illustrating an example of a stream 204 and corresponding meta image indices, particularly MetaImage(t0,t2) 208g and MetaImage(t1,t3) 208h. On the surface, the meta image looks like a stream. However, they do not contain data like streams. They appear to contain data, because they reference the original data in the original stream. Specifically, the meta image indices contain a referential sequence of all of the changes to the associated volume between a first point in time and a second point in time. MetaImage(t0,t2) 208g thus includes a reference to the writing of two blocks "a" at time t0 starting at offset 0, a reference to the writing of four blocks "b" at time t1 starting at offset 4, and a reference to the writing of two blocks "c" at time t2 starting at offset 6.

Because of its configuration, the meta image can replay a sequence of changes "verbatim". By contrast, a sparse image does not support this function, because the sparse image doesn't preserve the sequence of changes, only the "end result".

Another example is CDP. When a user wants to create an image from a stream, he might be presented with a GUI dialog to allow him to pick a point in time. The stream architecture facilitates the synthesis of historical views of the stream that may be shown through the GUI. For example, the GUI dialog may be generated by creating a meta image to use as the basis for presenting a selection mechanism. Corresponding overhead data allows generation of a list of timestamps for each of the changes. This supports illustration of "gaps" where no writes were made for a minute or some significant period of time, and also supports displaying a piece of the data associated with each change.

The meta images also support various analysis. Examples include but are not limited to a histogram of activity, showing which ranges of the volume are changing frequently, showing the most common write lengths, showing whether writes are sequential or random, showing the portion of the volume that has changed in a time frame, the average rate of change, etc.

FIGS. 14A-C are block diagrams illustrating an example of stream overhead data 1400a-c. As noted previously the overhead data or portions thereof may be stored within the stream, or may be separately stored in association with the stream The set of overhead data 1400a-c in FIGS. 14A-C implements an example where each write, which may comprise many blocks, is accorded a piece of overhead data, rather than requiring overhead data for every block. Additionally, the example applies a timestamp only for a new write that has a different timestamp from the previous write, rather than requiring a potentially duplicative timestamp within the overhead data for successive writes. Finally, the example comprises overhead data that is of equal size, regardless of type. Various alternatives will be readily recognizable, with some specific examples offered below.

FIG. 14A illustrates overhead data 1400a for a typical write to the stream, denoted as "TYPE_WRITE". The overhead data 1400a includes an entry for the Block Offset in the corresponding volume, which is the block offset corresponding to the start of the write. Also included are the Length of the Write (in blocks) and the Block Offset of the data in the data store. This overhead data provides pointers to the start of the write in the volume and the data store, as well an indication of the length of the write. The terms block and offset correspond to one preferred implementation but it should be understood that other techniques for identifying the location and size of the data may be implemented.

One particular additional type of overhead data is illustrated in FIG. 14B. This overhead data is denoted TYPE_ZERO. This type of overhead data is used to provide an optimization wherein a write consisting of zeroes is recorded without requiring the corresponding zeroes to actually be physically stored. This can significantly economize on the use of storage for data in the stream.

The TYPE_ZERO overhead data includes the Block Offset in volume and Length of Write in Blocks, similar to that provided in the TYPE_WRITE overhead data. However, it is not necessary to retain the block offset in the data store, since physical storage is not required. Accordingly, this entry of the overhead data is blank (as noted, in this example the types of overhead data are of the same size). The usage of zeroes is purely by way of example. Additionally, the same principles may be applied to accommodate the same economization of storage where "ones" or other values are to be repeatedly stored.

Finally, a TYPE_TIME overhead data 1400c is illustrated in FIG. 14C. This type of overhead data 1400c adds a timestamp to the stream whenever a write occurs unless the previous write had the same timestamp value. In this fashion, successive writes that essentially occur at the same time (according to the granularity of the time stamp) avoid additional overhead data expense.

It should be appreciated that FIGS. 14A-C depict one example of a set of overhead data, and that numerous alternatives are available. For example, (1) additional types of overhead data may be included; (2) the overhead data may omit the TYPE_ZERO or the TYPE_TIME types; (3) a timestamp could be included as an entry in every TYPE_WRITE instance of overhead data; (4) overhead data could be associated with each and every block that is written; (5) characteristics other than block and offset may be used to define the location and size of data being stored. The artisan will readily recognize these and other potential options.

Figure 15:
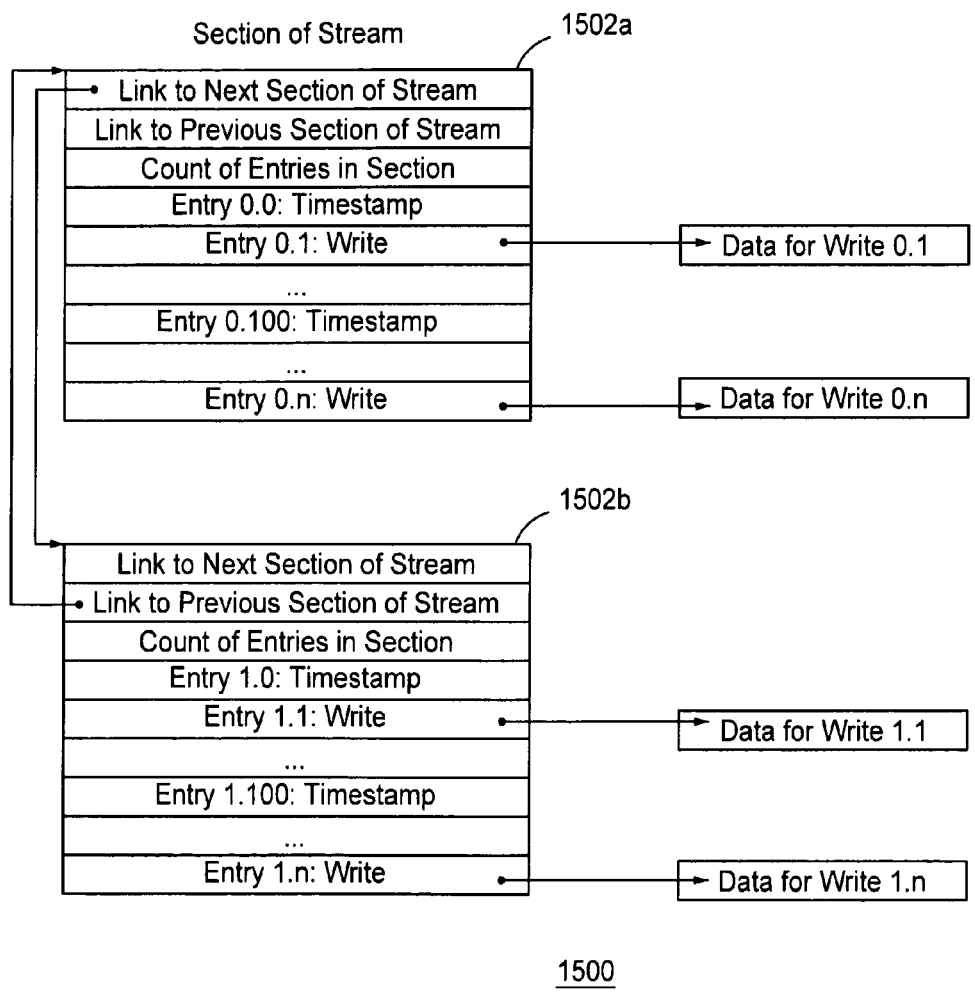
FIG. 15 is a block diagram illustrating an example of a stream layout as well as the option of composing a stream of sections.

FIG. 15 is a block diagram illustrating an example of a stream Layout as well as the option of composing a stream of Sections 1502a,b. With the sectioning feature, portions of the stream are easily segregated. This is useful for managing the location of the constituent sections of the stream, particularly where different storage resources are implemented for different portions of the stream. The use of Sections 1502a,b is optional, as a single stream Layout may be provided without sectioning. A single stream Layout option would include the features of either Section 1502a or 1502b, without the links to other sections.

The Sections 1502a,b respectively include Link to Next Section and Link to Previous Section entries to accommodate organization of the sectional relationship. The subsequent entry provides the number of entries "n" in the section 1502a,b.

Following this, any of the overhead data types may follow, such as the indicated Entry 0.0, which is a TYPE_TIME or timestamp entry, following by Entry 0.1, which is a TYPE_WRITE, entry 0.2, which is also a TYPE_WRITE, and so on. The pointer from the TYPE_WRITE type entries is illustrative of the indication of the block offset in the data store, with corresponding indicia of the Data for Write 0.1, 0.2, and so on through entry 0.n within Section 1502a, and Write 1.1 through 1.n within Section 1502b. It should be understood that the write transactions may be retained according to the linear append or arbitrary allocation modes as described previously. Either way, the stream Layout 1500 illustrates an example of retaining the sequence of write transactions according to the order in which the write transactions are received for a volume.

Figure 16:
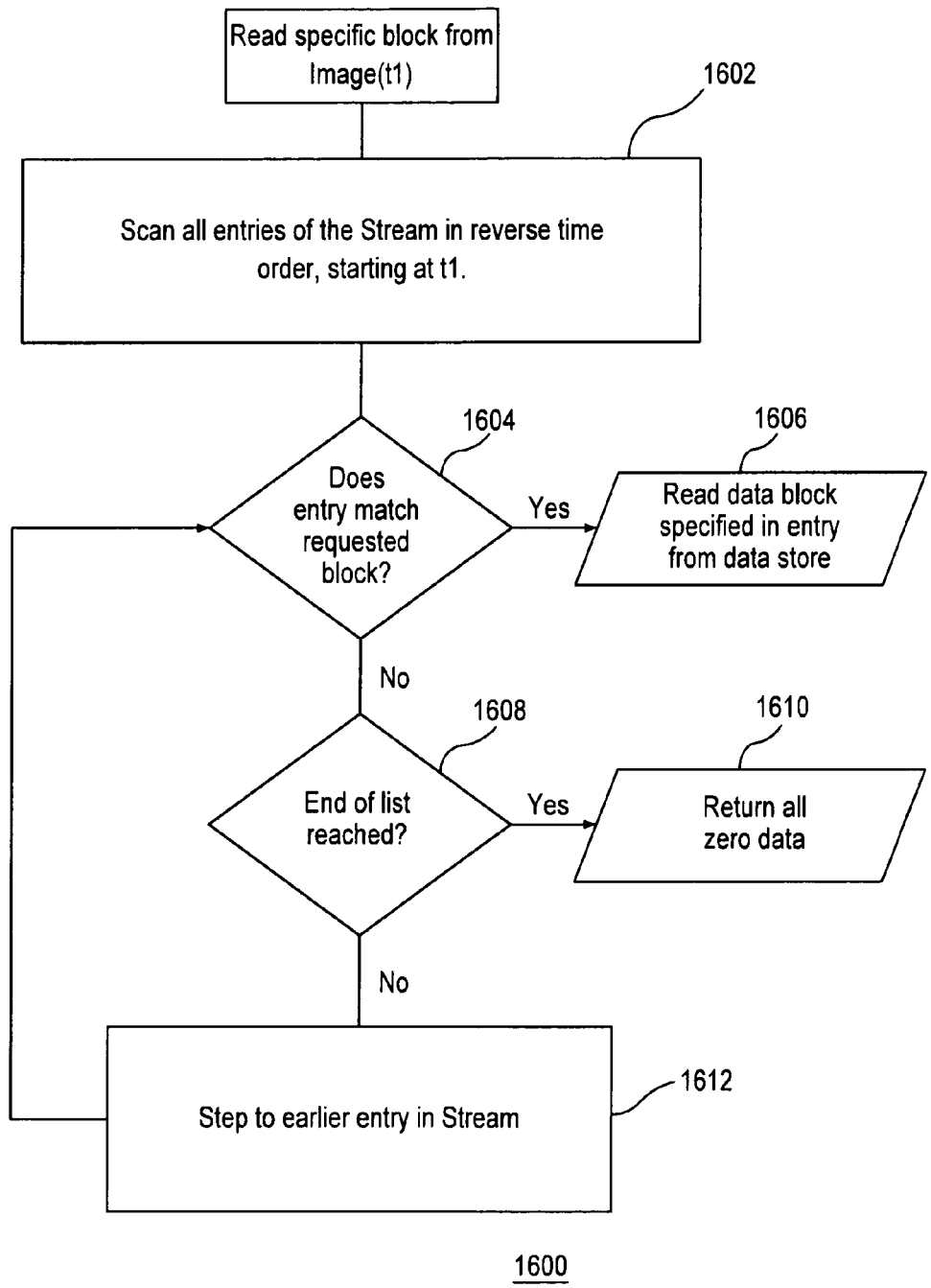
FIGS. 16-18 are flow diagrams illustrating examples of read and write operations in a stream architecture implementation.
Figure 17:
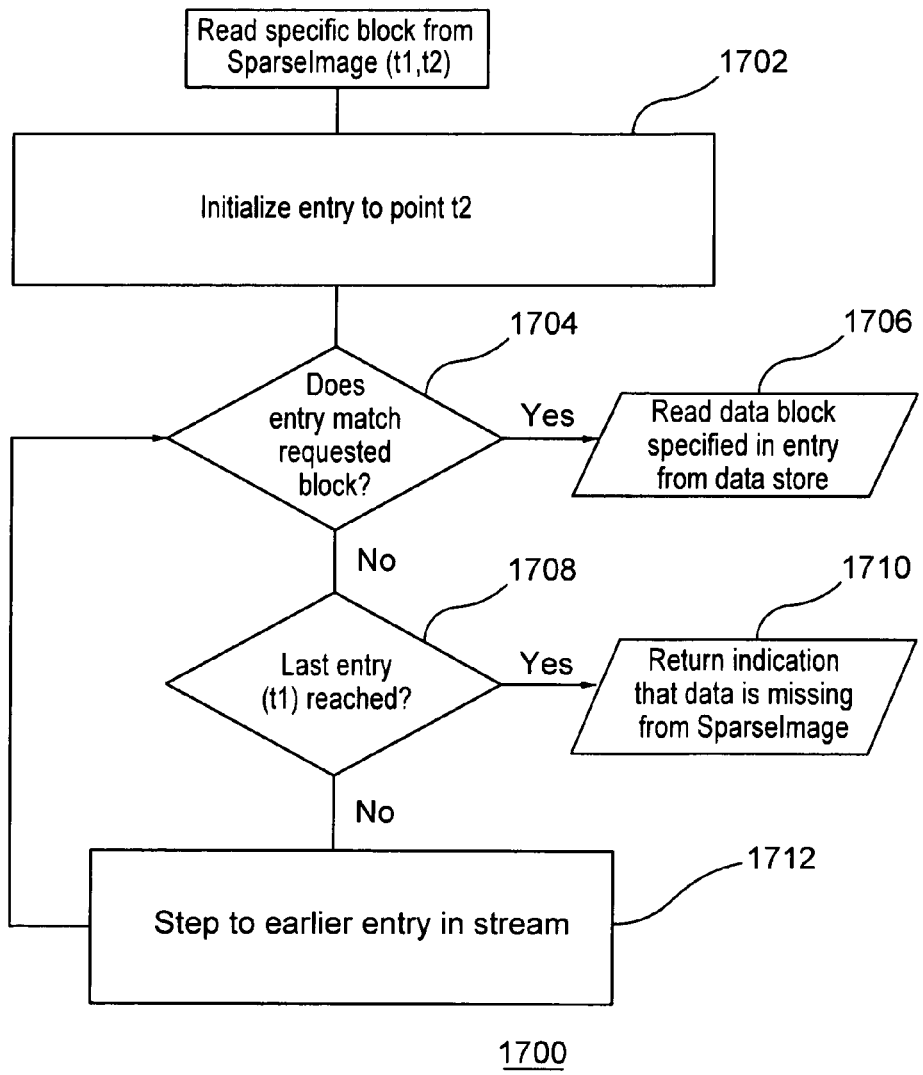
Figure 18:
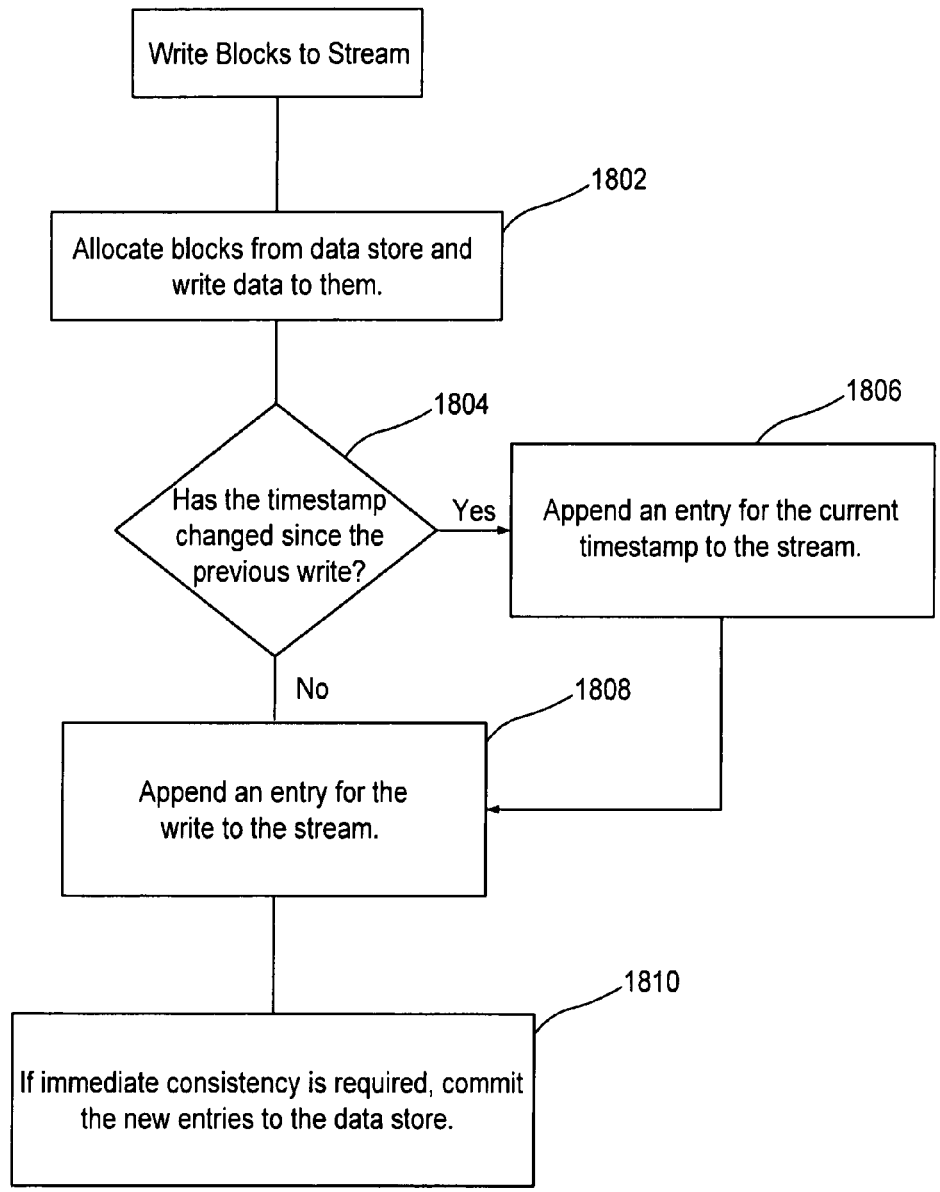

FIGS. 16-18 are flow diagrams respectively illustrating examples of read and write operations in a stream architecture implementation.

FIG. 16 illustrates a process 1600 for reading a specific block from a full Image, at time t1, denoted FullImage(t1) as described previously. The specific block is identified according to the block offset of the volume. All of the entries in the stream are scanned 1602 in reverse time order, starting at the time t1. This may optionally include navigation among multiple Sections of the stream as described above.

"Matching entries" are entries in the stream referencing the same block offset of the volume for the specific block being read. Starting at the most recent entry, a determination 1604 is made whether the current entry matches the requested block. If so, the data block specified in the entry is read 1606 and read is completed, since it would correspond to the most recent write of that block.

If it is determined 1604 that there is not a match, it is then determined 1608 whether the last entry for the stream has been reached. If so, this would mean that there were no matches in the stream, and therefore the read of the specified block would return 1610 all zero data as a result of the read.

If the end of the stream has not yet been reached, the process steps 1612 to the next (earlier) entry in the stream. The process continues with determinations 1604 of whether there is a match, with the first match prompting a read 1606 of the data block specified in the entry, and a determination 1608 that the last entry for the stream has been reached without a match prompting an all zero data read as described.

FIG. 17 illustrates a process 1700 for reading a specific block from a SparseImage(t1,t2). Again, the specific block is identified according to the block offset of the volume, but the entries of the stream to be examined do not proceed in reverse order through the entire stream. Instead, the sparse image read is dictated by the time boundaries of the sparse image. Accordingly, the process entails scanning all of the entries in the stream, starting at the time t2 and proceeding through the earlier time t1. Again, this may optionally include navigation among multiple Sections of the stream. This commences by initializing 1702 entry to time t2.

The read is otherwise similar to that described for the read of the Full Image. Matching entries are those entries in the stream referencing the same block offset of the volume for the specific block being read. Starting at the most recent entry, a determination 1704 is made whether there is a match for the specifically requested block. If so, the data block specified in the entry is read 1706 and read is completed, since it would correspond to the most recent write of that block.

If it is determined 1704 that there is not a match, it is then determined 1708 whether the last entry (t1) for the stream in the sparse image range has been reached. If so, this would mean that there were no matches in the stream for SparseImage(t1,t2), and therefore the read of the specified block would return 1710 indication that data for the specified block is missing from the SparseImage(t1,t2).

If the end of the stream has not yet been reached, the process steps 1712 to the next (earlier) entry in the stream. The process continues with determinations 1704 of whether there is a match, with the first instance of a match prompting a read 1706 of the data block specified in the entry, and a determination 1708 that the last entry for the stream has been reached without a match prompting the indication of missing data as described.

FIG. 18 illustrates a process 1800 for writing blocks to a stream. A write may correspond to multiple blocks. The process initially allocates 1802 blocks from the data store according to the requested write, and writes the data to the allocated blocks. If desired, a write zero scheme may be implemented, using overhead data such as the TYPE_ZERO type as described above. In such a scheme the zeroes are not actually written to the data store.

FIG. 18 illustrates an example wherein a timestamp is only included in the stream if the timestamp has changed since the previous write. This is optional, as the timestamp may simply be recorded in the stream for each write, regardless of whether it matches the previous one. A determination 1804 is made whether the timestamp has changed since the previous write. If it has changed, then an entry for the current timestamp is appended 1806 to the stream. This, for example, may be the overhead data denoted TYPE_TIME. If a Section implementation is being used, a new Section may also be allocated for the stream as necessary.

Next, an entry for the write is appended 1808 to the stream. The overhead data for this may be according to the TYPE_WRITE example as described above. This contains entries for the Block Offset in the volume for the write, as well as the Length of the Write (in blocks) and the Block Offset of the data in the data store.

Finally, a determination may be made as to whether immediate consistency is required. If so, then the new entries in the stream are committed 1810 to the data store. Since the data is written to the blocks in the data store (1802) at the start of the operation, this completes the process of committing the write to stable storage.

Figure 19:
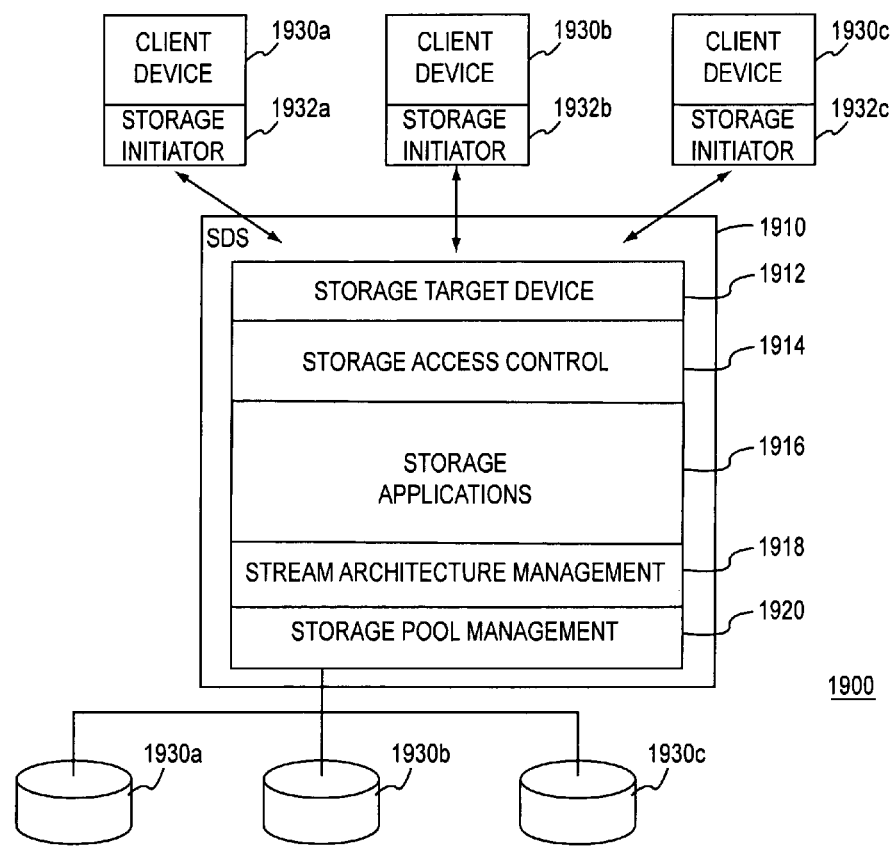
FIG. 19 is a schematic diagram illustrating an example of a storage network implementing stream architecture based data representation.

FIG. 19 is a schematic diagram illustrating an example of a storage network 1900 implementing stream architecture based data representation, particularly through inclusion of a stream architecture management module 1918.

The stream architecture management module 1918 is resident on a storage domain server (SDS) 1910. The SDS 1910 includes conventional computing resources (processor, memory, etc.) in order to carry out the functionality of operating as a storage resource for one or more client devices 1930a-c.

Specifically, the SDS 1910 may present virtual volumes to the client devices 1930a-c. Interfacing between the SDS 1910 and client devices 1930a-c may be according to any conventional protocol. For example, storage initiator devices 1932a-c of the client devices 1930a-c and a storage target device 1912 of the SDS 1910 may be established according to an iSCSI protocol. Alternatively, Fibre Channel (FC), SCSI, or other protocols may be used for communications between initiator and target devices.

The SDS 1910 provides security controls 1914 as well as any number of storage applications 1916 such as synchronous and asynchronous replication services, snapshots, caching, thin provisioning, etc.

The SDS 1910 also includes a storage pool management module 1920 that is configured to manage a pool of physical storage resources that are available to the SDS 1910. The physical storage resources 1930a-b may include hard disks, optical discs, tape, solid state memory, aggregations of any form of storage, or even another SDS that in turn provides corresponding physical storage resources.

In association with the provided storage service applications 1916, the stream architecture management module 1918 provides the stream architecture functionality described above, including the management of the stream with regard to write transactions directed to the SDS 1910, with retention of the corresponding sequence of write transactions according to the order in which the write transactions are received for any given volume that is presented to one or more of the client devices 1930a-c by the SDS 1910. The stream architecture management module also facilitates the association of the various types of stream images described above to the stream, and access to the stream in order to carry out the presentation and possible retention of corresponding images based upon the described stream images, also as described above.

The stream architecture management module 1918 is preferably provided as software, but may also implement hardware, firmware, or combinations of software, hardware, and/or firmware. It may be stored in memory and execute on a conventional processing platform as has been described. The program code of the stream architecture module 1918 may also be stored in non-volatile memory including but not limited to hard disks, optical disks, flash drives, or any non-transitory computer readable medium.

Figure 20:
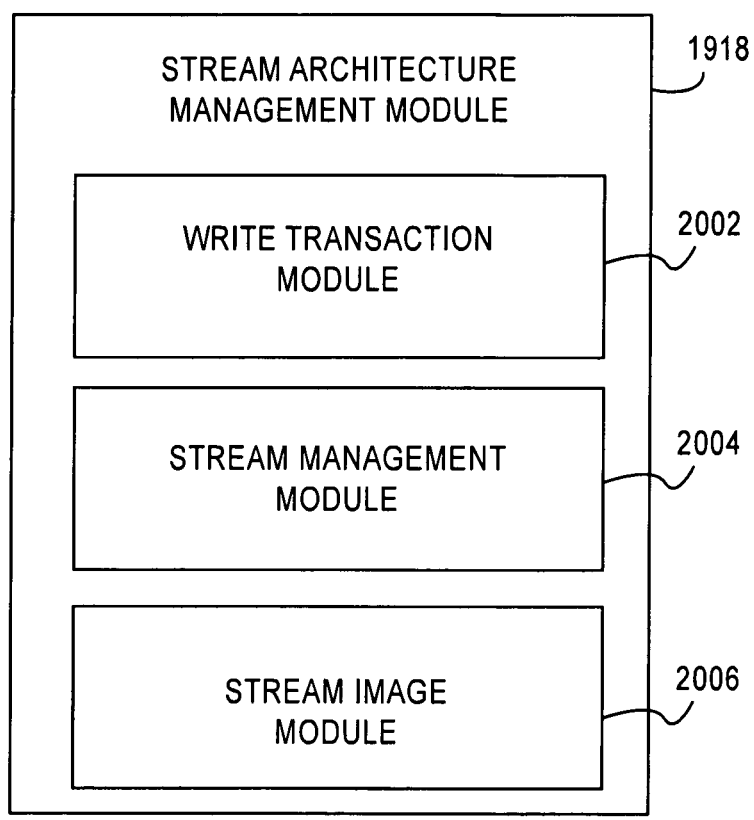
FIG. 20 is a block diagram illustrating an example of a computer system configured to include a stream architecture for data representation.

FIG. 20 is a block diagram illustrating an example of a stream architecture management module 1918 in further detail. Specifically, the stream architecture management module 1918 includes a write transaction module 2002, a stream management module 2004 and a stream image module 2006.

The write transaction module 2002 receives the write transactions to volumes presented to client devices, and the stream architecture management module 2004 is configured to manage the retention of the stream based upon the received write transactions corresponding to any given volume. The stream architecture may optionally implement an append scheme wherein when a space is overwritten on a stream architecture volume, there is no overwrite in the associated stream. Instead, the write is appended to the stream. It is noted that appending each write transaction to a single store is not the only mechanism for maintaining the stream. The writes can be stored wherever is convenient, may be placed in arbitrary locations, and may implement a plurality of virtual or physical stores. However, whether in a linear append mode or an arbitrary allocation mode, the sequence of write transactions according to the order in which the write transactions are received for a given volume is retained. Additionally, as described previously, the maintenance of the sequence of write transactions may be performed within the stream itself, or via overhead data, which itself may be separately stored.

Finally, the stream image module associates stream images to the stream. The various types of stream images are described above. Generally, a stream image provides a representation of the data in the given volume for a point in time by referencing a non-contiguous subset of the sequence of write transactions in the stream. Noted examples include full and sparse image representations of the data in the given volume. Layering of stream images is also provided as described previously. Finally, any given stream image may be generated for the point in time retroactively, to accommodate retrieval of the full (or other) representation of the data in the given volume at a time after the point in time has passed.

Thus embodiments of the present invention produce and provide a stream architecture for data representation. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for data representation comprising:
receiving write transactions to a given volume, the write transactions respectively including one or more blocks, such that the write transactions have differing numbers of blocks;
retaining a stream including a sequence of the write transactions according to the order in which the write transactions are received for the given volume between a first point in time and a second point in time after the first point in time, wherein each write transaction in the sequence of the write transactions is distinctly and sequentially identified in the stream, such that individual entries in the stream represent respective individual instances of the write transactions and the corresponding differing numbers of blocks occurring in the sequence of the write transactions;
receiving a read request directed to the given volume for data corresponding to an intermediate point in time that is between the first point in time and the second point in time;
in response to the read request, retrieving data in the given volume for the intermediate point in time by referencing a non-contiguous subset of the sequence of write transactions in the stream in reverse order starting at the intermediate point in time, wherein said referencing the non-contiguous subset of the sequence of the write transactions comprises excluding at least one entry in the sequence of write transactions between the intermediate point in time and the first point in time,
wherein an additional copy of underlying data for the write transactions is not required to concurrently retain the stream and coherency of the given volume even where the underlying data involves a write to a given block in the given volume to which data has previously been written; and
generating a first stream image corresponding to the stream for the intermediate point in time, wherein the first stream image provides a full representation of a new volume at the intermediate point in time by referencing a non-contiguous subset of the sequence of the write transactions in the stream,
wherein an additional stream is layered on the first stream image, the additional stream providing the sequence of the write transactions for the new volume following the intermediate point in time, the additional stream being separate from the stream, such that write transactions directed to the given volume are appended to the stream and write transactions directed to the new volume are appended to the additional stream.

2. The method of claim 1, wherein the sequence of the write transactions is maintained in a data structure wherein sequential write transactions, including underlying data for the write transactions, are appended to the data structure to retain the stream.

3. The method of claim 1, wherein underlying data for the write transactions are referentially included in the stream.

4. The method of claim 1, wherein overhead data contains information for maintaining the sequence of the write transactions, the overhead data being retained within the stream.

5. The method of claim 1, further comprising:
generating a second stream image for the stream corresponding to a second intermediate point in time, wherein the second stream image provides a sparse representation of the data in the given volume, the sparse representation representing an end result of changes to the volume between a previous point in time and the second intermediate point in time, the previous point in time being after the first point in time and before the second intermediate point in time.

6. The method of claim 1, wherein the first stream image is one of a plurality of stream images that respectively provide different representations of the data in the given volume for different points in time by referencing distinct non-contiguous subsets of the sequence of write transactions in the stream, the plurality of stream images being respectively accessible for reading data from the given volume according to the different representations using a single instance of data as provided in the retained stream.

7. The method of claim 1, wherein the stream is retained such that a write to any given one of the blocks requires only one instance in the stream.

8. A non-transitory computer readable medium storing program code for data representation, the program code being executable to perform operations comprising:
receiving write transactions to a given volume, the write transactions respectively including one or more blocks, such that the write transactions have differing numbers of blocks;
retaining a stream including a sequence of the write transactions according to the order in which the write transactions are received for the given volume between a first point in time and a second point in time after the first point in time, wherein each write transaction in the sequence of the write transactions is distinctly and sequentially identified in the stream, such that individual entries in the stream represent respective individual instances of the write transactions and the corresponding differing numbers of blocks occurring in the sequence of the write transactions;

receiving a read request directed to the given volume for data corresponding to an intermediate point in time that is between the first point in time and the second point in time;

in response to receiving the read request, retrieving data in the given volume for the intermediate point in time by referencing a non-contiguous subset of the sequence of write transactions in the stream in reverse order starting at the intermediate point in time, wherein said referencing the non-contiguous subset of the sequence of the write transactions comprises excluding at least one entry in the sequence of write transactions between the intermediate point in time and the first point in time, wherein an additional copy of underlying data for the write transactions is not required to concurrently retain the stream and coherency of the given volume even where the underlying data involves a write to a given block in the given volume to which data has previously been written; and generating a first stream image corresponding to the stream for the intermediate point in time, wherein the first stream image provides a full representation of a new volume at the intermediate point in time by referencing a non-contiguous subset of the sequence of the write transactions in the stream, wherein an additional stream is layered on the first stream image, the additional stream providing the sequence of the write transactions for the new volume following the intermediate point in time, the additional stream being separate from the stream, such that write transactions directed to the given volume are appended to the stream and write transactions directed to the new volume are appended to the additional stream.

9. The computer readable medium of claim 8, wherein the sequence of the write transactions is maintained in a data structure wherein sequential write transactions, including underlying data for the write transactions, are appended to the data structure to retain the stream.

10. The computer readable medium of claim 8, wherein underlying data for the write transactions are referentially included in the stream.

11. The computer readable medium of claim 8, wherein overhead data contains information for maintaining the sequence of the write transactions, the overhead data being retained within the stream.

12. The computer readable medium of claim 8, wherein the operations further comprise:

generating a second stream image for the stream corresponding to a second intermediate point in time, wherein the second stream image provides a sparse representation of the data in the given volume, the sparse representation representing an end result of changes to the volume between a previous point in time and the second intermediate point in time, the previous point in time being after the first point in time and before the second intermediate point in time.

13. The computer readable medium of claim 8, wherein the first stream image is one of a plurality of stream images that respectively provide different representations of the data in the given volume for different points in time by referencing distinct non-contiguous subsets of the sequence of write transactions in the stream, the plurality of stream images being respectively accessible for reading data from the given volume according to the different representations using a single instance of data as provided in the retained stream.

14. The computer readable medium of claim 8, wherein the stream is retained such that a write to any given one of the blocks requires only one instance in the stream.

15. An apparatus for data representation comprising:
a processor; and
a memory, the memory storing program code executable by the processor to perform operations comprising:

receiving write transactions to a given volume, the write transactions respectively including one or more blocks, such that the write transactions have differing numbers of blocks;

retaining a stream including a sequence of the write transactions according to the order in which the write transactions are received for the given volume between a first point in time and a second point in time after the first point in time, wherein each write transaction in the sequence of the write transactions is distinctly and sequentially identified in the stream, such that individual entries in the stream represent respective individual instances of the write transactions and the corresponding differing numbers of blocks occurring in the sequence of the write transactions;

receiving a read request directed to the given volume for data corresponding to an intermediate point in time that is between the first point in time and the second point in time;

in response to receiving the read request, retrieving data in the given volume for the intermediate point in time by referencing a non-contiguous subset of the sequence of write transactions in the stream in reverse order starting at the intermediate point in time, wherein said referencing the non-contiguous subset of the sequence of the write transactions comprises excluding at least one entry in the sequence of write transactions between the intermediate point in time and the first point in time, wherein an additional copy of underlying data for the write transactions is not required to concurrently retain the stream and coherency of the given volume even where the underlying data involves a write to a given block in the given volume to which data has previously been written; and generating a first stream image corresponding to the stream for the intermediate point in time, wherein the first stream image provides a full representation of a new volume at the intermediate point in time by referencing a non-contiguous subset of the sequence of the write transactions in the stream, wherein an additional stream is layered on the first stream image, the additional stream providing the sequence of the write transactions for the new volume following the intermediate point in time, the additional stream being separate from the stream, such that write transactions directed to the given volume are appended to the stream and write transactions directed to the new volume are appended to the additional stream.

16. The apparatus of claim 15, wherein the first stream image is one of a plurality of stream images respectively provide different representations of the data in the given volume for different points in time by referencing distinct non-contiguous subsets of the sequence of write transactions in the stream, the plurality of stream images being respectively accessible for reading data from the given volume according to the different representations using a single instance of data as provided in the retained stream.

17. The apparatus of claim 15, wherein the stream is retained such that a write to any given one of the blocks requires only one instance in the stream.

\* \* \* \* \*